United States Patent
Lecerf (10) Patent No.: US 9,002,100 B2
(45) Date of Patent: Apr. 7, 2015

(54) MODEL UNCERTAINTY VISUALIZATION FOR ACTIVE LEARNING

(75) Inventor: Loïc M. Lecerf, Biviers (FR)

(73) Assignee: Xerox Corporation, Norwalk, CT (US)

(*) Notice: Subject to any disclaimer, the term of this patent is extended or adjusted under 35 U.S.C. 154(b) by 1802 days.

(21) Appl. No.: 12/080,414

(22) Filed: Apr. 2, 2008

(65) Prior Publication Data

US 2009/0252404 A1 Oct. 8, 2009

(51) Int. Cl.
*G06K 9/00* (2006.01)
*G06K 9/62* (2006.01)

(52) U.S. Cl.
CPC .................................. *G06K 9/6254* (2013.01)

(58) Field of Classification Search
USPC ............ 382/154–159; 700/47; 706/12, 20, 21
See application file for complete search history.

(56) References Cited

U.S. PATENT DOCUMENTS

| | | | | |
|---|---|---|---|---|
| 5,073,953 | A * | 12/1991 | Westdijk ........................ | 382/176 |
| 6,950,786 | B1 * | 9/2005 | Sonneland et al. ............... | 703/2 |
| 2003/0082503 | A1 * | 5/2003 | Suzuki et al. .................. | 434/118 |
| 2004/0193036 | A1 * | 9/2004 | Zhou et al. ..................... | 600/407 |
| 2005/0090911 | A1 * | 4/2005 | Ingargiola et al. .............. | 700/36 |
| 2005/0226495 | A1 * | 10/2005 | Li ................................ | 382/159 |
| 2007/0005356 | A1 | 1/2007 | Perronnin | |
| 2007/0150801 | A1 | 6/2007 | Chidlovskii et al. | |
| 2007/0258648 | A1 | 11/2007 | Perronnin | |
| 2010/0017354 | A1 * | 1/2010 | Chan et al. ..................... | 706/47 |

OTHER PUBLICATIONS

Y. Baram, et al., Online Choice of Active Learning Algorithms, *Journal of Machine Learning Research 5*, pp. 255-291, 2004.
A.L. Berger et al., A Maximum Entropy Approach to Natural Language Processing, *Computational Linguistic s*, vol. 22, pp. 39-71, 1996.
B. Chidlovskii, et al., ALDAI: Active Learning Documents Annotation Interface, In *ACM Symposium on Document Engineering*, pp. 184-185, 2006.
B. Chidlovskii, et al., Semi-Supervised Visual Clustering for Spherical Coordinates Systems, In *The 23rd Annual ACM Symposium on Applied Computing*, (2008).
F.L. Chung, et al., Clustering Analysis of Gene Expression Data Based on Semi-Supervised Visual Clustering Algorithm, *Soft Computing*, vol. 10, Issue 11, pp. 981-993, 2006 (Abstract).
D.D. Lewis, et al., A Sequential Algorithm for Training Text Classifiers, In *Proceedings of the International ACM-SIGIR Conference on Research and Development in Information Retrieval*, (1994).
H.T. Nguyen, et al., Active Learning Using Pre-Clustering, In *Proceedings of the 21st International Conference on Machine Learning (ICML)*, pp. 79-86, 2004.

(Continued)

*Primary Examiner* — Kim Vu
*Assistant Examiner* — Michael Vanchy, Jr.
(74) *Attorney, Agent, or Firm* — Fay Sharpe LLP (57) ABSTRACT

An active learning system and method are disclosed for generating a visual representation of a set of unlabeled elements to be labeled according to class. The representation shows the unlabeled elements as data points in a space and each class as a class point in the space. The position of each of the data points in the space reflects the uncertainty of a model regarding the classification of the respective element. The color of each data point also reflects the uncertainty of the model regarding the classification of the element and may be a mixture of the colors used for the class points.

23 Claims, 7 Drawing Sheets
(4 of 7 Drawing Sheet(s) Filed in Color)

(56) References Cited

OTHER PUBLICATIONS

T. Osugi, et al., Balancing Exploration and Exploitation: A New Algorithm for Active Machine Learning, In *Proceedings of the 5th Intl. Conference on Data Mining (ICDM)*, pp. 330-337, 2005.
H. Raghavan, et al., Active Learning with Feedback on Both Features and Instances, *Journal of Machine Learning Research 7*, pp. 1655-1686, 2006.
N. Roy, et al., Toward Optimal Active Learning Through Sampling Estimation of Error Reduction, In *Proceedings of the 18th International Conference on Machine Learning (ICML)*, pp. 441-448, 2001.
H. S. Seung, et al., Query by Committee, In *Proceedings of the 5th Annual ACM Workshop on Computational Learning Theory*, pp. 287-284, 1992.
S. Tong, *Active Learning: Theory and Applications*, PhD Thesis, Adviser-Daphne Koller, 2001.
D. J. Newman, et al., *UCI Repository of Machine Learning Databases*, 1998 (Abstract).
B. Chidlovskii, et al., HTML-to-XML Migration by Means of Sequential Learning and Grammatical Inference, *IJCAI'05 Workshop on Grammatical Inference Applications*, Scotland, Jul. 2005 http://www.xrce.xerox.com/Publications/Attachments/2005-025/gia05-chidlovskii.pdf.
D. A. Cohn, Active Learning With Statistical Models, *Journal of Artificial Intelligence Research 4*, pp. 129-145, (1996).
U.S. Appl. No. 11/524,100, filed Sep. 19, 2006, Perronnin.

* cited by examiner

MODEL UNCERTAINTY VISUALIZATION FOR ACTIVE LEARNING

BACKGROUND

The exemplary embodiment relates to active learning. It finds particular application in connection with a system and method for generating a visual representation of uncertainty associated with the labeling of elements for assisting a human annotator in selecting the next element to label.

The goal of active learning is to identify patterns based on a limited amount of data. The technique is currently used in machine learning tasks, such as classification, when the work of automatically labeling data is too costly. In the active learning stage, a human annotator chooses an appropriate discrete class from a set of classes available for labeling an element and labels the element accordingly. Based on the labeling of a group of such elements, a model is progressively learned which allows new elements to be labeled automatically by the model, based on their extracted features. Active learning finds application in a variety of fields. One example is the classification of documents according to content-based classes (such as "sports," "politics," "business," "science," etc., in the case of new articles). Here, the elements to be labeled are the documents themselves and the features used by the model may be words, phrases, or the like which occur within the document. Another application is the labeling of parts of a document, such as labeling the title, author, etc. Here the features may be related to document structure, font size, position on the page, etc. Yet another application is in the labeling of images according to visual classes based on the visual content, where the elements to be labeled are the images and the features may be extracted from patches of the image using image processing techniques.

Several approaches have been developed to make the active learning process more efficient. In some approaches, a user annotates an element that is proposed by an algorithm to improve the model quality. Since the manual annotation is often costly, a goal of these active learning approaches is to reduce the number of elements to annotate by an iterative process in which the model is updated as new elements are labeled. At each iteration, an algorithm aims to propose that the annotator labels the element which has the maximum benefit for the classifier. These approaches can allow a significant reduction in the training set required to build a relevant model which is then able to label the remaining unannotated dataset. There are, however, several drawbacks to this framework. First, the user has no relevant information about the quality of the current model. Although some metric based on uncertainty of unannotated element prediction may give a general idea of model quality, this is generally insufficient to provide the annotator with enough information to be able to make meaningful decisions for when to allow automatic labeling. In particular, the annotator has no knowledge of where the uncertainty in the model lies and how many and what kind of elements remain to be annotated.

Second, traditional active learning methods do not permit the annotator to select elements for labeling. Rather, the next element to label is chosen by the machine and the user's only responsibility is to associate a class with the proposed element. Where the classification is a two-class problem, a machine may be programmed to identify suitable elements for labeling which will improve the model. For multi-class problems, however, the complexity of identifying elements for labeling rapidly increases with the number of classes. In practice, no active learning algorithm is optimal for all datasets.

In one approach, referred to as the Uncertainty Based Sampling method, the aim is to label, at each iteration, the least certain element according to the current classifier. (See, LEWIS, D., AND GALE, W. A sequential algorithm for training text classifiers. In *Proc. Int'l ACM-SIGIR Conf. on Research and Development in Information Retrieval* (1994)). Another approach, Query by Committee, chooses the element which maximizes disagreement between several classifiers (See, SEUNG, H. S., OPPER, M., AND SOMPOLINSKY, H. Query by committee. In *Proc. 5th Annual ACM Workshop on Computational Learning Theory* (1992), pp. 287-284). The Error rate reducing method tries to select an element that, once added to the training set, minimizes the error of generalization (See, ROY, N., AND MCCALLUM, A. Toward optimal active learning through sampling estimation of error reduction. In *Proc. 18th Int'l Conf. on Machine Learning (ICML)* (2001), pp. 441-48). Other approaches combine several active learning algorithms. (See, for example, OSUGI, T., KUN, D., AND SCOTT, S. Balancing exploration and exploitation: A new algorithm for active machine learning. In *Proc. 5th Int'l Conf on Data Mining (ICDM)* (2005), pp. 330-337).

When the dataset is large, or when the classifier used is computationally complex, learning or inference may be computationally expensive. In such cases, the user annotates several elements at each iteration. However, in such a process, there is a tendency for the system to propose similar elements for labeling. Pre-Clustering methods aim to reduce this (See NGUYEN, H., AND SMEULDERS, A. Active learning using pre-clustering. In *Proc. 21st Int'l Conf. on Machine Learning (ICML)* (2004), pp. 79-86). However, this approach complicates the active learning process and ensuring a good clusterization is difficult.

Sometimes, the cost associated with the annotation is different according to the element which is to be labeled. Automatic learning does not take into account the annotation cost.

In traditional approaches, the annotator continues the active learning stage until the model is believed to be relevant to be applied automatically to non-annotated data. However, he may not have a reliable understanding of model quality to make such a decision. There are some active learning systems that involve the user in the decision process. In one approach, a user can switch between two modes: either to annotate the least confident unlabeled data (as in Uncertainty Based Sampling) or to annotate the most confident set. (See, CHIDLOVSKII, B., FUSELIER, J., AND LECERF, L. Aldai: active learning documents annotation interface. In *ACM Symp. on Document Engineering* (2006), pp. 184-185). A plot showing the evolution of model confidence helps him to make a good tradeoff between the two annotation modes. Such approaches, however, give no relevant information about the model uncertainty that would permit the annotator to choose the next element to annotate.

Another kind of interactive approach is semi-supervised visual clustering (See, CHUNG, K. F.-L., WANG, S., DENG, Z., SHU, C, AND HU, D. Clustering analysis of gene expression data based on semi-supervised visual clustering algorithm. *Soft-Comput.* 10, 11 (2006), pp. 981-993; and CHIDLOVSKII, B., AND LECERF, L. Semi-supervised visual clustering for spherical coordinates systems. In *23rd Annual ACM Symp. on Applied Computing* (2008)). Here, the user annotates unlabeled data, helped by an interactive visual clustering system. The visualization is useful to understand structure of data but does not permit the annotator to visualize the model quality on the data for the annotation task. The aim is to clusterize data with help of labeled elements but not to find the minimal training set required to build a relevant model.

The exemplary embodiment provides a system and method for providing an annotator with information on the current model uncertainty so that he will be able to make an intelligent choice regarding the next element to label.

INCORPORATION BY REFERENCE

The following references, the disclosures of which are incorporated herein in their entireties by reference, are mentioned:

U.S. Pub. No. 20070150801, entitled INTERACTIVE LEARNING-BASED DOCUMENT ANNOTATION, by Boris Chidlovskii, et al., discloses a document annotation system which includes a graphical user interface that is used by an annotator to annotate documents. An active learning component trains an annotation model and proposes annotations to documents based on the annotation model.

U.S. Pub. No. 20070005356, entitled GENERIC VISUAL CATEGORIZATION METHOD AND SYSTEM by Florent Perronnin, discloses generic visual categorization methods which complement a general vocabulary with adapted vocabularies that are class specific. Images to be categorized are characterized within different categories through a histogram indicating whether the image is better described by the general vocabulary or the class-specific adapted vocabulary.

U.S. Pub. No. 20070258648, entitled GENERIC VISUAL CLASSIFICATION WITH GRADIENT COMPONENTS-BASED DIMENSIONALITY ENHANCEMENT, by Florent Perronnin, discloses an image classification system with a plurality of generative models which correspond to a plurality of image classes. Each generative model embodies a merger of a general visual vocabulary and an image class-specific visual vocabulary. A gradient-based class similarity modeler includes a model fitting data extractor that generates model fitting data of an image respective to each generative model and a dimensionality enhancer that computes a gradient-based vector representation of the model fitting data with respect to each generative model in a vector space defined by the generative model. An image classifier classifies the image respective to the plurality of image classes based on the gradient-based vector representations of class similarity.

U.S. application Ser. No. 11/524,100, filed Sep. 19, 2006, entitled BAGS OF VISUAL CONTEXT-DEPENDENT WORDS FOR GENERIC VISUAL CATEGORIZATION, by Florent Perronnin, discloses an image classification system in which models are built for image categories based on the co-occurrences of pairs of visual words.

BRIEF DESCRIPTION

In accordance with one aspect, an active learning system is provided. The system includes a representation module which generates a visual representation of a set of unlabeled elements. The representation shows the unlabeled elements as data points in a space and shows each of a plurality of classes as a class point in the space. Each class point has an associated visual identifier. Positions of the data points in the space are dependent on the uncertainty of a model regarding the classification of the respective unlabeled elements. A visual identifier of each of the data points is dependent on the visual identifier of at least one of the class points and the uncertainty of the model regarding the classification of the element. A graphical user interface displays the representation to an annotator and enables the annotator to select one of the elements for labeling with a class label for one of the classes. An updating module receives class labels applied by the annotator and updates the model.

In another aspect, an active learning method includes generating a visual representation of a set of elements to be labeled according to class. The representation shows each of a plurality of classes as a class point in a space and shows elements to be labeled as data points in the space. Each class point has an associated visual identifier. Positions of the data points in the space are dependent on the uncertainty of a model regarding the classification of the respective unlabeled elements. A visual identifier of each of the data points is dependent on the visual identifier of at least one of the class points and the uncertainty of the model regarding the classification of the element. The method further includes displaying the representation, providing for an annotator to select one of the elements for labeling with a class label for one of the classes, and updating the model based on class labels applied by the annotator.

In another aspect, a method includes initializing a model with at least one labeled element for each of a set of classes. The model is configured for assigning, to each unlabeled element, probabilities that the element should be labeled with class labels for a plurality of the classes. The method further includes, for a set of unlabeled elements to be labeled, generating a visual representation in which each of the classes is represented as a class point arranged in an at least two-dimensional space and the unlabeled elements are represented as data points in the space. Each class point has a unique color. A position of each of the data points in the space is dependent on the assigned probabilities. A color of each of the data points is dependent on the colors of the class points and the assigned probabilities.

BRIEF DESCRIPTION OF THE DRAWINGS

The application file contains at least one drawing executed in color. Copies of this patent or patent application publication with color drawings will be provided by the Office upon request and payment of the necessary fee.

FIG. 4 illustrates representations generated by the exemplary system without noise (FIG. 4A) and with added noise (FIG. 4B);

FIG. 6 illustrates representations generated by the exemplary system initially (FIG. 6A), during model learning (FIG. 6B), and at the end of the model learning phase (FIG. 6C);

DETAILED DESCRIPTION

A visual active learning system and method are disclosed which present unlabeled data in an uncertainty space and allow the annotator to choose the next element to label. The model uncertainty visualization is a powerful tool for visualizing the nature of uncertainty for a current classifier. This approach is an alternative to traditional active learning in which the user can control the process and bring domain knowledge, insight and/or feedback.

Figure 1:
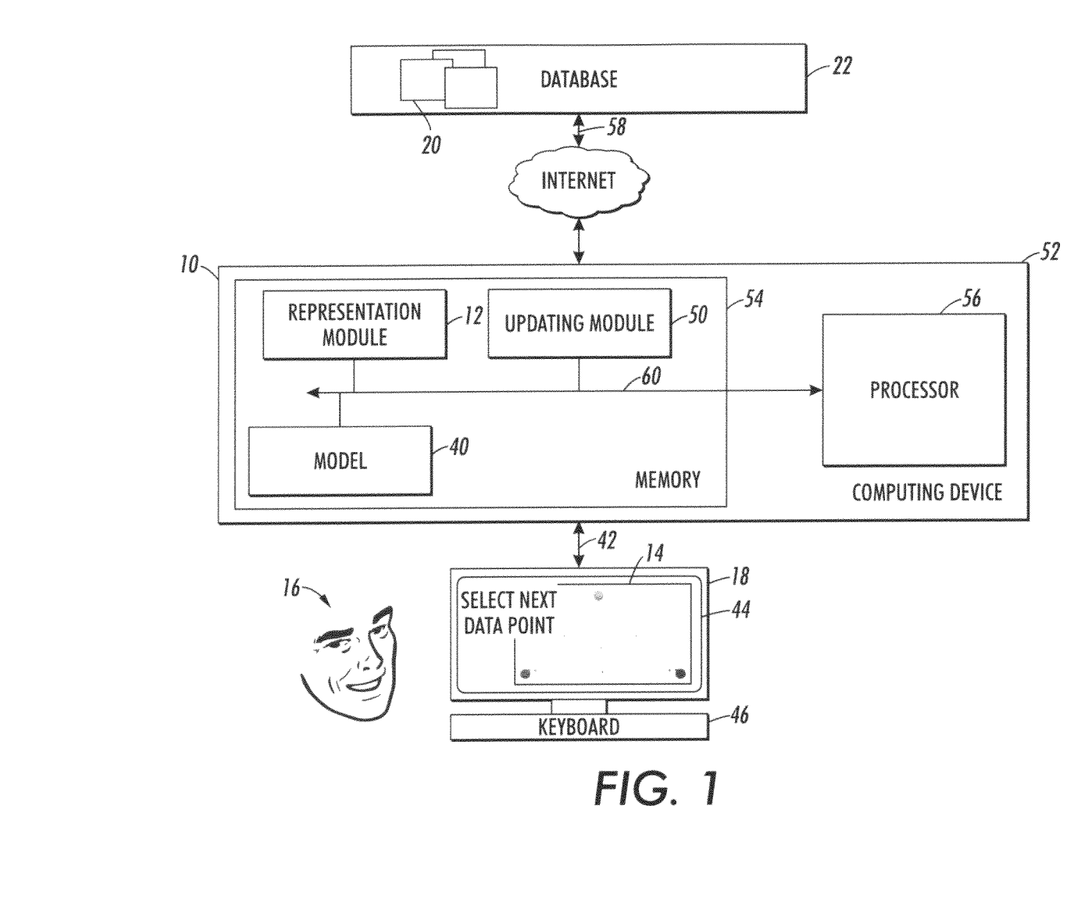
FIG. 1 is a schematic view of an active learning system in accordance with one aspect of the exemplary embodiment.

With reference to FIG. 1, a visual active learning (VAL) system 10 is shown. The computer-implemented VAL system 10 includes a representation module 12, which generates a visual representation 14 of an annotation problem for displaying to a user 16 serving as a manual annotator. The visual representation 14 is displayed to the user on a graphical user interface (GUI) 18. The representation 14 represents the unlabeled elements 20 of a dataset, such as documents, parts of documents, or images that the VAL system 10 desires to label (annotate) according to class. In the exemplary embodiment, the documents 20 to be labeled are stored in an associated database 22, which is accessible to the system 10.

Figure 2:
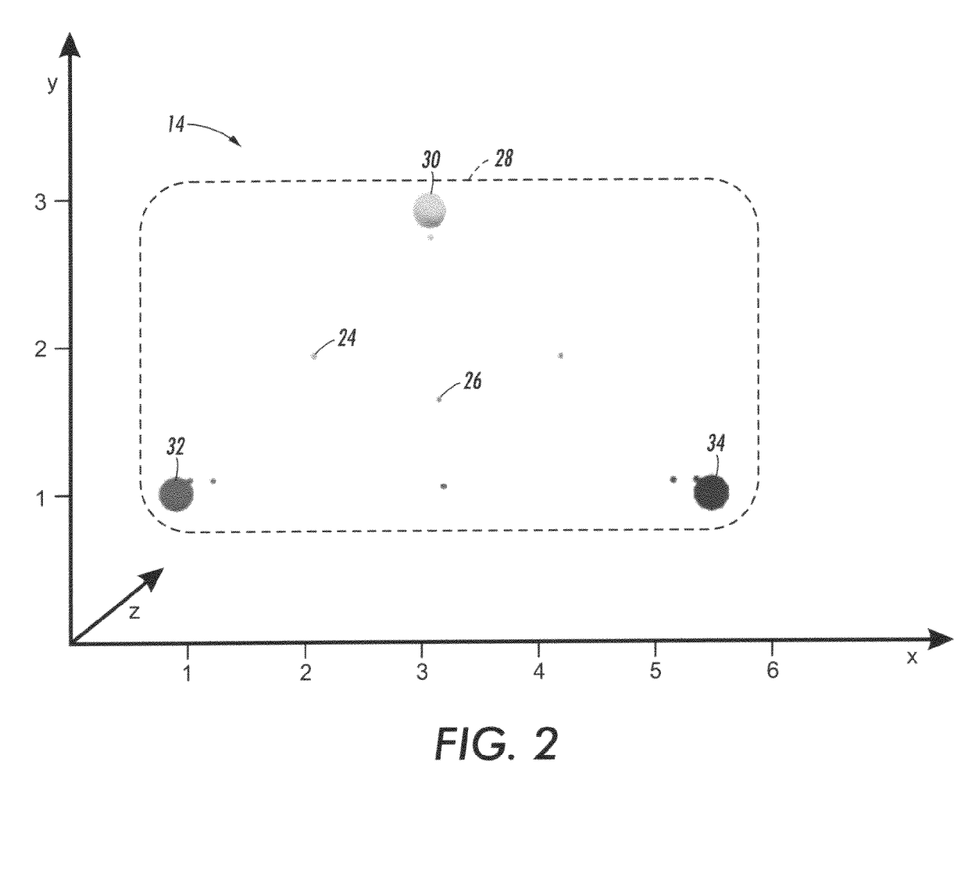
FIG. 2 illustrates a representation generated by the exemplary system of FIG. 1.

With reference also to FIG. 2, which shows an exemplary representation 14, each of the elements 20 to be labeled is shown in the representation as a data point 24, 26, etc., having a size and shape, such as a small circle, in the case of a two dimensional representation, or a sphere, in the case of a three dimensional representation. The data points may all be of the same size and shape. As will be appreciated, on a typical screen, a three dimensional representation is displayed in two dimensions and uses projections, shading, or the like to illustrate the three dimensions. Positioned within a two or three dimensional space 28 occupied by the set of data points 24, 26, are class points 30, 32, 34, etc. Each class point 30, 32, 34 represents one of the classes with which an unlabeled data point can be labeled by the annotator 16. Thus, the number of class points corresponds to the number of classes. The class points 30, 32, 34 may be represented by larger circles or spheres, or other suitable shape or by another representation method which renders them distinguishable, to the annotator, from the data points 24, 26, etc.

As illustrated in FIG. 1, a model 40, comprising a probabilistic classifier, is progressively trained, using the labels applied by the annotator 16 as a guide, to associate features of the elements with the various classes and thereby predict the appropriate class for an unlabeled element 20. The type of features recognized by the model 40 will depend on the set of elements 20 to be annotated and may include words, visual objects, document structure, and the like. For example, in the case of images, a classifier as described in above-mentioned U.S. Pub. Nos. 20070005356 and 20070258648 may be used.

The visual representation 14 provides the annotator 16 with an indication of the overall uncertainty of the model 40 with respect to the dataset to be annotated. In particular, the position in space of each of the data points 24, 26 reflects the uncertainty the model 40 regarding the classification of the element 20. The relative distances of a data point 24 from two (or more) of the class points 30, 32, 34 may be a function of the probability, assigned by the model 40, that the respective element 20 should be labeled as being in those classes.

In FIG. 2, three class points 30, 32, 34 are shown, each in a different color (red, yellow, and blue, respectively). Each of the class points is shaded to give it a spherical appearance. Data points 24, 26, etc. are arranged at various distances from the class points 30, 32, 34, the relative distances representing their joint probabilities of being in each of the three classes. Each data point's position, relative to at least two (or all of) the class points, is a function of a probability, assigned by the model 40, that the respective element 20 should be labeled with that class.

Each of the class points 30, 32, 34 is assigned a unique color and/or other visual identifier (such as shape, shading, or the like) which allows it to be distinguished from the colors of other class points. To provide a good visual distinction between the classes, the class point colors are generally as different from each other as possible, within the limitations of the color gamut available on the GUI 18. Alternatively, the annotator 16 may be permitted to choose the colors of one or more of the class points from a suggested color palette.

In turn, the data points 24, 26 are assigned a color based on the color of the class points and the uncertainty of the model regarding the classification of the corresponding element 20. Thus, the more probable a class label (as determined by the model 40), the closer the data point is in color to the color of the respective class point.

In the exemplary embodiment, each data point's color, relative to the color of at least two (or all of) of the class points, is a function of a probability assigned by the model that the respective element should be labeled with those classes. Thus, for example, data point 24 has an orange color, indicating its red and yellow components, and thus an assigned probability of being in each of the classes corresponding to class points 30 and 32. Since there is little or no blue component, the annotator can recognize that the corresponding element has little or no assigned probability of being in the class corresponding to class point 34. Compare this with data point 26, which in addition to yellow and red, clearly has a blue component and thus can be recognized as having a probability of being in all three classes. Since it is approximately centrally located in the space, an annotator may chose to annotate the element corresponding to this data point.

While three class points are shown in FIG. 2, it is to be appreciated that there may be any number, such as 2, 4, 6, 10 or more class points distributed in the space, each corresponding to a respective class. Further, while the class points are illustrated as being of the same size, they may be of different sizes to represent for example, the number of data points which have already been labeled as being in that class. Thus, as more data points are labeled, the class points grow in size, correspondingly. Alternatively or additionally, in the case of a three dimensional space 28, the size of the class points may be used to aid in creating the perspective view and thus reflect whether they are closer to the viewer (larger) or further away (smaller).

As shown in FIG. 1, the GUI 18, is in communication with the representation module 12, e.g., via a wired or wireless link 42, and includes a display 44, such as an LCD screen, and a user input device 46, such as a touch or writable screen, cursor control device, keyboard, combination thereof, or the like, for enabling the annotator 16 to select a data point and for labeling the corresponding element. The annotator may click on the data point 24, which causes the associated element 20 to be displayed on the screen 44. The annotator 16 uses his judgment to decide the most appropriate class from the set of available classes and apply an appropriate label. An updating module 50, which is in communication with the GUI, via link 42 or a separate link, receives the class labels applied to the elements 20 and updates the model 40 based thereon. The labels may be applied to the documents as XML/HTML labels or stored separately from the documents, e.g., in a file.

The exemplary GUI 18 includes a position selection mechanism which enables an annotator to vary positions of the class points 30, 32, 34 in the space 28. For example, the user may highlight a class point by clicking on it then executing a drag and drop operation to move it to a suitable new location. Alternatively, the user may specify selected x,y,z coordinates for the class point or actuate a four way arrow to relocate the class point (in a three dimensional space, a six way arrow may be employed). For a three dimensional space 28, the space may be rotatable on the GUI 18 to allow viewing from different angles. The GUI 18 may also include a zoom feature for zooming in on a particular region of the space 28.

The exemplary representation module 12 and updating module 50 may be embodied in hardware or software or a combination thereof. In the exemplary embodiment, these components are hosted by a computing device 52, such as one or more general purpose computing devices, e.g., a desktop or laptop computer, or a dedicated computing device, such as a server. The computing device 52 has memory 54, which stores the representation module 12 and updating module 50 as software instructions, and a processor 56, in communication with the memory 54, which executes the instructions to perform the exemplary method illustrated in FIG. 3. The model 40 and database 22 may be stored in memory 54 or may be remote therefrom and accessible to the VAL system 10 by a suitable wired or wireless link 58. Components of the VAL system may communicate via a data/control bus 60.

The computer device 52 may be a PC, such as a desktop, a laptop, palmtop computer, portable digital assistant (PDA), or a dedicated computing device, such as a server.

The memory 54 may represent any type of computer readable medium such as random access memory (RAM), read only memory (ROM), magnetic disk or tape, optical disk, flash memory, or holographic memory. In one embodiment, the memory 54 comprises a combination of random access memory and read only memory. The processor 56 may be a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 3, can be used to implement the exemplary method. In some embodiments, the processor 56 and memory 54 may be combined in a single chip.

The annotator 16 may have some prior knowledge of the ambiguities in the model 40 regarding the dataset to be annotated or may have no prior knowledge. The annotator 16 generally has sufficient background knowledge to correctly annotate unlabelled elements 20, although in some cases, the annotator may communicate with a human domain expert for assistance when the annotator has difficulty labeling an element.

Figure 3:
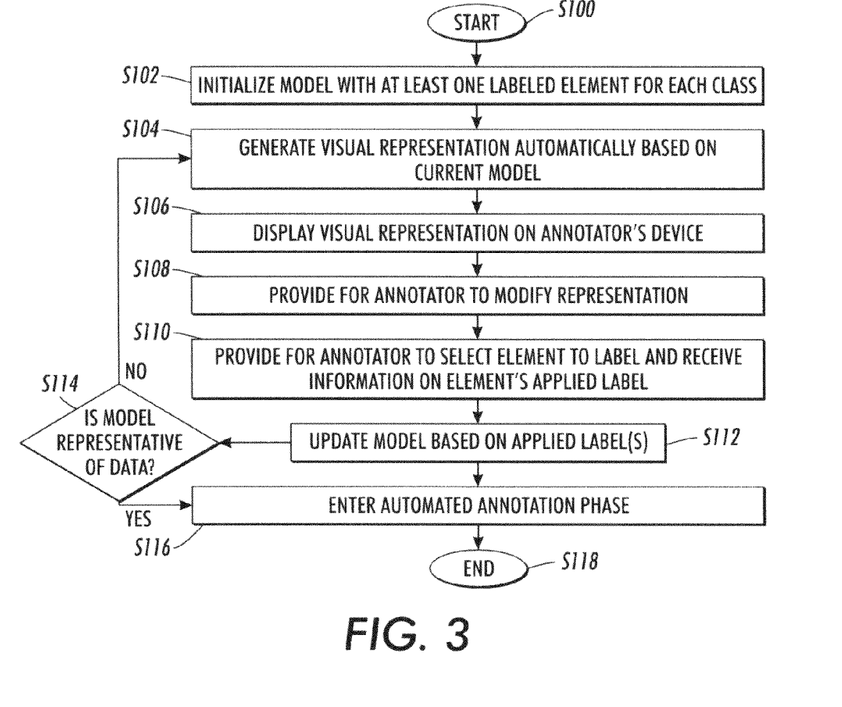
FIG. 3 illustrates a method for model uncertainty visualization in accordance with another aspect of the exemplary embodiment.

FIG. 3 illustrates steps of the exemplary active learning method. The method begins at step S100. At S102, a model 40 to be trained is initialized with at least one labeled element for each class. At S104, a visual representation 14 of a set of elements 20 to be labeled according to class is generated automatically. The representation shows each of a plurality of classes as a class point 30, 32, 34 in a space 28 and shows elements to be labeled as data points 24, 26, etc. in the space. Each class point has an associated visual identifier (e.g., color). A position of each of the data points in the space is dependent on the uncertainty of a model regarding the classification of the respective element. A visual identifier (e.g., color) of each of the data points is dependent on the visual identifier of at least one of the class points and the uncertainty of the model regarding the classification of the element. At S106, the representation is displayed to the human annotator 16, e.g., on graphical user interface 18. At S108, the annotator is permitted to modify the representation, for example, by moving the class points in space and/or to change the weighting (relative importance) of the classes. Further details on the weighting follows below. At S110, provision is made for an annotator to select one or more of the elements for labeling with a class label for one of the classes, for example by asking the annotator to click on one of the data points and then presenting the corresponding element on the screen for viewing by the annotator. The annotator can then input his or her selected label to the VAL system via the GUI. Where the computational cost of updating the model is high, the visual active learning system may propose that the user labels several elements at each iteration. At S112, the model is updated, based on the class label(s) applied by the annotator. Steps S106-S112 of the method are repeated until the user (or the VAL system) is satisfied that sufficient of the elements have been labeled for the VAL system to complete the annotation process automatically, without the annotator's assistance. For example, at S114, the user determines if the model is adequate, based, in part, on a review of the current representation, and if so, the VAL system receives the annotator's request to proceed to the automated learning phase and completes the labeling of the unlabeled elements (S116). The method ends at S118.

The method illustrated in FIG. 3 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 3, can be used to implement the method for visualizing an active learning problem.

Further details of the exemplary VAL system 10 and method now follow.

As noted above, the representation 14 provides a visualization of the model's uncertainty with respect to labeling the elements 20. This allows the annotator 16 to choose the next element to label in the active learning process. There are several advantages to this approach. One is that the user may bring insight, feedback or domain knowledge, which enable him to choose efficiently the next element. Another is that he may adapt the labeling process to the particular dataset (e.g., considering one or more of annotation cost, unbalanced class, scalability, etc.) or adapt strategies developed during the annotation process. For example, the annotator can manage the annotation cost, adapt annotation strategies or avoid repeatedly labeling similar items. Since no active learning algorithm is optimal for all datasets, the user-selected elements can often be more efficient, overall, than a system in which the next element to label is proposed by the system. The exemplary embodiment, however, does not preclude a system in which the next element is proposed by the system. However, in such a case, the user is still able to lead the active learning process—the annotator is allowed to accept or reject the proposal at least on some occasions.

Model uncertainty on unannotated items is projected in two dimensional or 3 dimensional space. In one embodiment, the model 40 assigns a probability $P(Y_c|X_i)$ to the unlabeled elements 20 where $X_i$ is the element and $Y_c$ is the class, $P(Y_c|X_i)$ is the assigned probability that class $Y_c$ is the correct label for element $X_i$. The higher the probability $P(Y_c|X_i)$ for the current classifier is, the more the item $X_i$ is attracted by the respective class point. Likewise, the color of $X_i$ is function of the color of each class point $Y_c$ weighted by $P(Y_c|X_i)$. This combination of color and position is a powerful way of reducing visual ambiguities, particularly when the number of classes is high.

This visualization 12 gives both a clear insight on model quality and a deep knowledge about the nature of model uncertainty. The annotator 16 may then choose the most relevant item to label. After each annotation (or a group of annotations), the current model is augmented by the newly labeled element(s), and the representation is updated based on new unlabeled item predictions. The ability provided to the user to move or change the weighting of a class point allows improved visualization and/or a deeper analysis of uncertainty. The uncertainty of the model 40 is based on the predictions made on unlabeled data. The model uncertainty visualization aims to give both a simple and powerful framework to obtain a rapid overview of current model uncertainty and further, some detailed information about the model confidence on each data point.

In the following description, reference is made to a 3D space, but it will be appreciated that it can be applied equally to a 2D space. When the number of classes is 2, 3, or 4, each class point can be placed in the 3D space, with an equal distance between each class point. If the number of classes is greater than 4, the class points can be placed fairly randomly in space, allowing the annotator to move them according to his interest. Unlabeled data is projected in the 3D space as a function of class point positions. At each iteration, each data point is defined by a specific position and color. The correlation between the position and the color gives a natural comprehension of current uncertainty.

In one exemplary embodiment, the position $(x_i, y_i, z_i)$ of a data point $X_i$ in three mutually perpendicular dimensions x, y, z, is defined as a function of the model uncertainty and the current position of the class points, as follows:

$$(x_i, y_i, z_i) = (\Sigma_c W^c P_i^c x^c, \Sigma_c W^c P_i^c y^c, \Sigma_c W^c P_i^c z^c) \quad (1)$$

where:

$P_i^c = P(Y_c|X_i)$ for the current model. The probabilities for $X_i$ for all the classes sum to 1.

$W^c$ are class point weights. Weights may be used as an additional parameter. They may be preset to 1, with the option for the user to manually adjust them according to some specific user interests.

c is a class, c∈C with C the set of possible classes of the dataset.

As an example, for three classes C1, C2, C3 that are currently at positions (1,1,1); (5.4, 1. 1.5); and (3, 2.9, 0.5) in space (i.e., analogous to the class points 32, 34, 30 shown in FIG. 2), an element with a probability 0.4 of being in class C1, 0.4 of being in class C2, and 0.2 of being in class C3 will result in a data point with position computed as follows (assuming the weights are all equal):

$$(x_i, y_i, z_i) = (0.4*1)+(0.4*5.4)+(0.2*3),(0.4*1)+(0.4*1)+ \\ (0.2*2.9),(0.4*1)+(0.4*1.5)+(0.2*0.5)=3.16,1.38, \\ 1.1$$

The higher the model 40 predicts the labeling of data $X_i$ with the class $Y_c$, the closer the data point of $X_i$ is to the class point of $Y_c$. All unlabeled items may be projected with this principle. However, when several elements have a same distribution of probabilities, their data points have exactly the same position in the representation. In order to allow a visualization of the quantity of elements having a specific model ambiguity, a small amount of random noise may be added in the formula (1):

$$(x_i, y_i, z_i) = (\Sigma_c W^c P_i^c x^c + \epsilon x^c \text{Rand}, \Sigma_c W_c P_i^c y^c + \epsilon y^c \text{Rand}, \\ \Sigma_c W^c P_i^c z^c + \epsilon z^c \text{Rand},) \quad (2)$$

where:

Rand is a function that returns a random value (e.g., between 0 and 1);

$\epsilon$ is the degree of noise added.

Figure 4A:
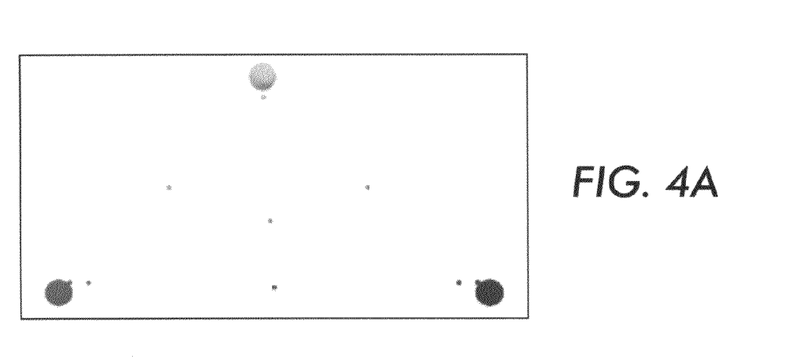
Figure 4B:
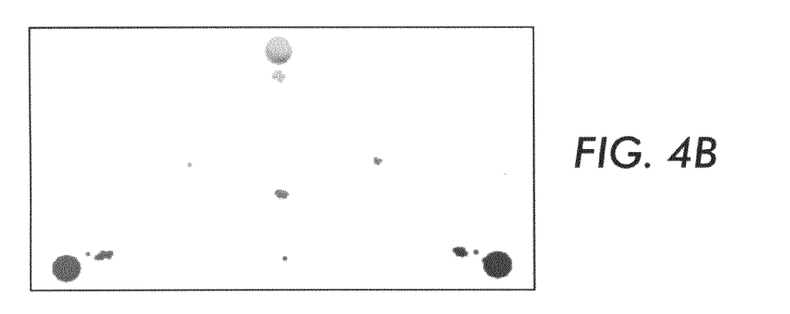

These parameters can be manually adjusted. In one exemplary embodiment & is from about 0.5-5% of the dimensions of the space. E.g., $\epsilon=0.01$. Noise may thus improve the visual understanding of model uncertainty by allowing a representation of the number of elements concerned. For example, FIG. 4 shows a data set a) without added noise, and b) with added noise ($\epsilon=0.01$). In FIG. 4a, nine model ambiguities can be identified, but there is no indication of the element distribution. In FIG. 4b, the same visual information is provided about the nature of the ambiguity, but there is also information about the approximate number of elements associated with each ambiguity.

In one embodiment, colors in the representation 14 are determined in a color space, e.g., RGB. Class point colors are expressed as color values for each of a set of color dimensions (such as R, G, and B dimensions). The color values for the data points are computed from the color values of the class points to reflect the probability assigned by the model that the respective element is labeled with the respective class. For example, a color can be expressed in the RGB color space by indicating how much of each of the red, green, and blue is included. Each color dimension can vary between a minimum value (fully dark) and a maximum value (full intensity) for each of R, G, and B. If all the color dimensions are at minimum, the result is black. If all the color dimensions are at maximum, the result is white. The color values may be expressed as gray scale numbers, e.g., in the range 0 to 255. This is the common scale used in computer graphics representations.

In an exemplary embodiment, the color of the class point $Y_c$ is defined by its three components $(R_c, G_c, B_c)$. The color of a data point $X_i, (R_i, G_i, B_i)$ is a derived mixture of colors, as defined by the expression:

$$(R_i, G_i, B_i) = (\Sigma_c W^c P_i^c G^c, \Sigma_c W^c P_i^c G^c, \Sigma_c W^c P_i^c B^c,) \quad (3)$$

As for Equations (1) and (2), the weights $W^c$ can all be equal to 1 (and thus ignored) or one or more of the classes may be more highly or differently weighted than others. The weights used in Equation 3 may be the same as used in Equations 1 and 2, or different weights may be applied. While it is contemplated that each data point may have the exact color as specified by this equation, in other embodiments, a smaller set of colors may be used with each color dimension being divided into a set of different ranges. Thus, for example, if the R component is split into 8 equal ranges, R values in the range 255-219 may all be approximated to the same representative value, such as the highest value in the range (255), lowest (219), or an intermediate value (such as 239).

Figure 5:
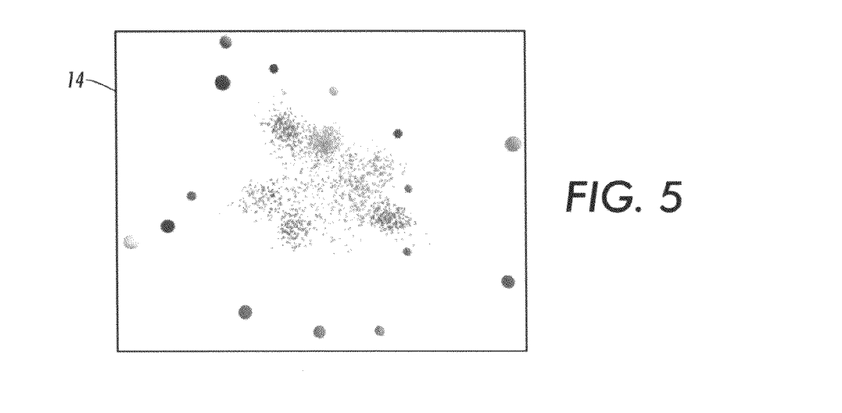
FIG. 5 illustrates a representation generated by the exemplary system of FIG. 1 for a complex data set.

This projection allows a very versatile scalability. A dataset can be small or large in terms of the number of its dimensions (class dimensionality), its number of elements, or both. As an example, the data used in generating FIG. 4 consisted only of 150 elements, and 3 classes (data for categorizing irises in D. J. NEWMAN, S. HETTICH, C. B., AND MERZ, C. UCI repository of machine learning databases, 1998, hereinafter "Newman"). A more complex data set is illustrated in the representation shown in FIG. 5 (16 classes, 3573 items). This data set was drawn from elements extracted from OCR-ed business cards to be labeled according to the appropriate field (person name, company name, address line 1, address line 2, telephone number, fax, logo, etc). As can be appreciated from FIGS. 4 and 5, the representation 14 may be efficiently used on a simple dataset or on a large or complex dataset.

As previously noted, once the representation 14 has been generated by the system 10, some basic functionalities can be implemented by the user for a deeper analysis of the uncertainty projection (S108):

1. Moving class points: Initially, the class points are disposed randomly or optimally if the number of classes is lower than or equal to 4. Thereafter, the user can move them, to see interaction between specific class points. This may be useful to reduce ambiguity for large dataset.

2. Changing View: 3D projection increases the data visibility, particularly if the number of classes is high. Changing the view allows a better comprehension of the data. In one embodiment, a user may rotate the space, e.g., through 360 degrees in two mutually perpendicular planes. The GUI may display an appropriate rotation selection mechanism actuable by the annotator. Alternatively or additionally, the user may zoom in to focus on a specific model ambiguity. The GUI may display an appropriate zoom selection mechanism actuable by the annotator.

3. Weighting class points: In the space, each class point may be manually weighted in order to increase or decrease the importance of a class. It is particularly useful for unbalanced class distribution or in a rare class problem. For example, a simple right or left click on a class point weight selector displayed on the GUI may be used to increase or decrease the class point weight. Thus, for example, if one of the classes is known to be less likely than others (few elements are manually assigned to this class), it may be accorded a lower weight than other classes.

Figure 6A:
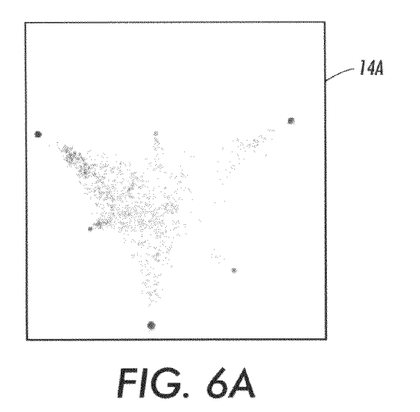
Figure 6B:
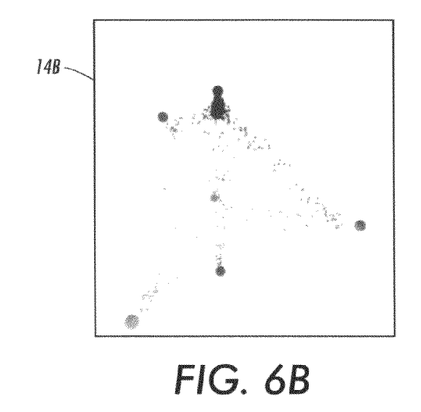
Figure 6C:
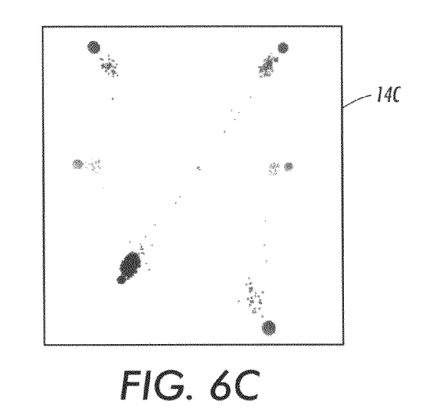

FIG. 6 shows three phases of the exemplary visual active learning process. The dataset used in this example is CPO, a collection of scientific articles. Three representations 14A, 14B, and 14C are shown. The screenshot (FIG. 6a) is the initial projection, where only one instance per class is labeled. The second one (FIG. 6b) shows the process when a few items have been labeled by the annotator. The last one (FIG. 6c) shows a more advanced phase, when a relevant sample is already annotated. These three phases show that a clear insight about model confidence can be viewed at any time during the process.

In order to obtain P(Y|X) values for each Y, a probabilistic classifier can be used by the model 40. For each unlabeled element $X_i$, the classifier computes the probability that this element is labeled $Y_c$ for each c∈C. The exemplary method and system are not limited to any particular type of classifier, merely that some method is provided for assigning the probability vales. Examples of such classifiers include maximum entropy classifiers, naive Bayes classifiers, support vector machines, and the like. In one embodiment, a user may switch between classifiers to gain a different understanding of the data.

One suitable classifier is the MaxEnt classifier. MaxEnt is based on the Maximum Entropy principle. (See BERGER, A. L., PIETRA, S. D., AND PIETRA, V. J. D. A maximum entropy approach to natural language processing, Computational Linguistics, vol. 22, pp. 39-71 (1996)). According to this approach, the best model to estimate probability distributions from data is the one that is consistent with certain constraints derived from the training data, but otherwise it makes the fewest possible assumptions. The distribution with the "fewest possible assumptions" is the one with the highest entropy, and closest to the uniform distribution. With the constraints based on features $f_j(X, Y)$, the Maximum Entropy method attempts to maximize the conditional likelihood of P(Y|X) which is represented as a log-linear model:

$$P(Y \mid X) = \frac{1}{Z(X)} \exp\left(\sum_j \lambda_j \cdot f_j(X, Y)\right) \qquad (4)$$

where parameters $\lambda_j$ are learned from the training corpus and $Z(Y_c)$ is a normalizing factor to ensure that all the probabilities sum to 1. Thus, $$Z(X) = \Sigma_y \exp(\Sigma_j \lambda_j \cdot f_j(X,Y)).$$

In the selection step (S110) some information may be provided to the user 16 to assist the user in selecting the next element to label. For example, information about the Kernel Farthest First (KFF) data points may improve the exploration of the data. For further details on KFF, see BARAM, Y., EL-YANIV, R., AND LUZ, K. Online choice of active learning algorithms. *J. Mach. Learn. Res.* 5, 255-291 (2004) (Hereinafter Baram). According to Baram, it is sometimes useful to choose the unannotated element that is farthest from the labeled elements. The challenge remains to make a correct tradeoff between exploitation and exploration. Different metrics may be used in order to compute such a tradeoff, as described in Baram and also in OSUGI, T., KUN, D., AND SCOTT, S. Balancing exploration and exploitation: A new algorithm for active machine learning. In *Proc. 5th Int'l Conf. on Data Mining (ICDM)* (2005), pp. 330-337. Here again, a user can bring insight to make the decision.

In the foregoing, an alternative to traditional active learning methods has been described. The exemplary VAL system 10 provides a model uncertainty visualization that projects unlabeled data in space. The annotator can then choose for himself the next element to annotate in order to fast increase model quality. This framework has several advantages. First, it leverages the user's knowledge in the active learning process and allows the model learning to benefit from his insight, feedback, and domain knowledge. In implementing the system on a collection of data, it is expected that the annotator may have substantial domain knowledge about the current collection. This information may be useful in outperforming traditional active learning methods. This knowledge might be about the nature of data, the distribution of classes, or the ambiguities between classes.

Second, the user is able to avoid repeatedly labeling similar items. When the dataset is large, or when the classifier used is computationally complex, learning or inference may be computationally expensive. In such cases, the user annotates several items at each iteration. Whereas conventional, automatic active learning may propose repeatedly labeling similar items, the present system allows the user to use his knowledge about the nature of model uncertainty to target several model ambiguities at each iteration, and thus reduce the likelihood that similar elements are annotated.

The VAL system 10 also facilitates management of costs. Sometimes, the cost associated with the annotation is different according to the item which is to be labeled. Automatic learning does not take into account the annotation cost. The exemplary VAL system allows an annotator to strike an appropriate balance between the cost of an annotation and the gain for the current model.

The VAL system also utilizes the user's inference on when to end the active learning process. The exemplary model uncertainty visual representation allows a user to intuitively evaluate when the model is sufficiently relevant for him to stop the active learning stage and allow the model to annotate elements unaided.

Without intending to limit the scope of the exemplary embodiment, the following Examples demonstrate the effectiveness of the system and method.

EXAMPLES

To evaluate the exemplary visual active learning system 10, tests were run comparing the system with other active learning approaches. Two specific cases have been evaluated. In the first case, the influence of the annotator's prior domain knowledge about the dataset is evaluated. In the second case, the impact of performing several annotations between two learning/inference steps is evaluated.

In each example, the active learning process begins with one labeled item per class. Next, an iterative process starts: an unannotated element of the training set is labeled and added to the current classifier. The model accuracy is then evaluated on a test set. In all tests, a cross-validation is used. For these tests, K-fold cross-validation was used. In K-fold cross-validation, the original sample is partitioned into K subsamples, where K may be 2, 3, etc. Of the K subsamples, a single subsample is retained as the validation data for testing the model, and the remaining K−1 subsamples are used as training data. The cross-validation process is then repeated K times (or "folds"), with each of the K subsamples used only once as the validation data. The K results from the folds then can be averaged (or otherwise combined) to produce a single estimation.

Three main active learning approaches are compared. The first is the exemplary visual active learning (Manual) method, where a user chooses, aided by the visual representation, the next element to label. In the representations, random noise was added, with $\epsilon=0.01$. The second approach is referred to as Uncertainty Based Sampling (UBS), where three different measures of uncertainty are defined: a difference metric, a product metric, and a maximum entropy metric. (See, TONG, S. *Active learning: theory and applications*. PhD thesis, 2001; and U.S. Pub. No. 20070150801):

1. Difference metric: $\text{Conf\_diff}(X)=p_1-p_2$ with $p_1$ the $i^{th}$ most important probability of $P(Y|X)$.
2. Product metric: $\text{Conf\_prod}(X)=\hbar_y P(Y|X)$
3. Maximum Entropy metric: $\text{Conf\_ME}(X)=\Sigma_c P(Y|X)\log(P(Y|X))$.

The last approach is a random approach (Random), where the next element to label is chosen randomly. In the case of VAL and Random, each evaluation is repeated three times and the average of the three results computed. The classifier used in all tests is the MaxEnt classifier.

Example A

Comparison of Active Learning Methods where Ambiguities are Unknown

Figure 7:
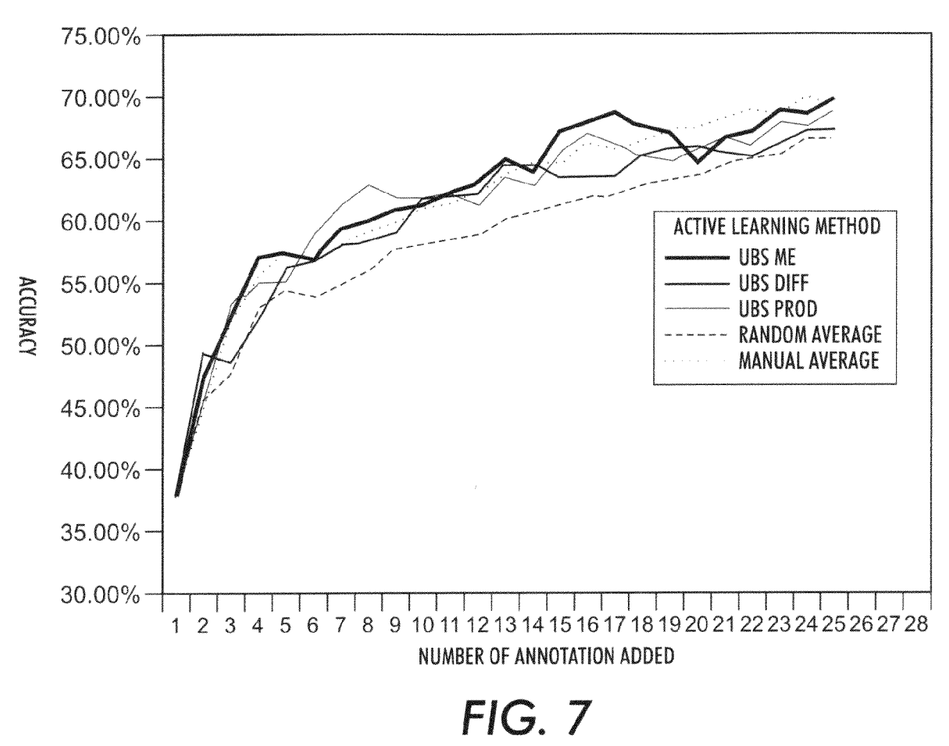
FIG. 7 is a plot illustrating the accuracy of a model generated through active learning by different methods, as a function of the number of elements annotated, in which the user has no prior knowledge of the dataset.

This evaluation used three datasets from the UCI collection (See, Newman). In this dataset, the user has no prior knowledge about the dataset. FIG. 7 shows the average for three datasets (Lymph, Iris and Glass). A three-fold cross validation was used (K=3).

In FIG. 7, accuracy is plotted against the number of annotations previously added to the model. Accuracy is a measure of the model's ability to correctly assign a label to an unlabeled element. Classical proportional accuracy is used for determining the accuracy (accuracy=sum (correct/total)). In all cases, accuracy increases as the number of annotations increases, i.e., the model learns from the user's annotations. On this dataset, the exemplary Visual Active Learning method (Manual average) appears to be at least comparable to the three Uncertainty Based Sampling (UBS) approaches tested and superior to the Random approach. This indicates that even without a previous knowledge of the dataset, manual annotation, assisted by the visual representation, can reduce the computation costs associated with the UBS method and yet provide at least comparable results.

Example B

Comparison of Active Learning Methods where Annotator has some Knowledge of Ambiguities In this example, a collection of scientific articles (CPO) was used as the data set. In the CPO collection, 6 classes are defined (Unknown, Reference, Author, Location, Title, and Organization). A two-fold cross validation (K=2) is used. Here the class distribution is unbalanced with a large number of elements (here, document parts) annotated as Unknown. In this example, all classes are initially equally weighted for purposes of determining accuracy (See Boris Chidlovskii, Jérôme Fuselier. HTML-to-XML Migration by means of sequential learning and grammatical inference. IJCAI 05 Workshop on Grammatical Inference Applications, Edinburgh, Scotland, 30 Jul. 2005). The user has some domain knowledge about this collection, such as a general understanding of the class distribution and the class ambiguities (e.g., that Location and Organization are generally more similar than Title and Reference).

Figure 8:
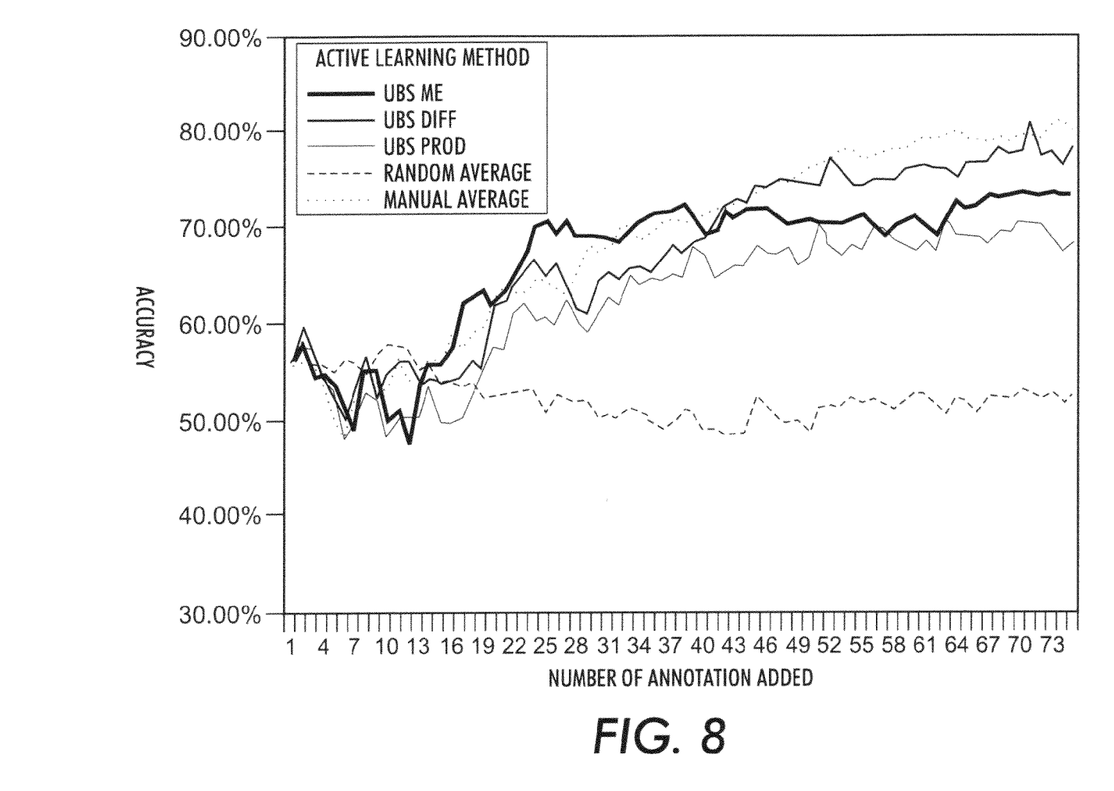
FIG. 8 is a plot illustrating the accuracy of a model generated through active learning by different methods, as a function of the number of elements annotated, in which the user has some prior knowledge of the dataset.

As previously noted, FIG. 6 shows exemplary representations for this data set. FIG. 8 shows the results for the CPO dataset. Here, Visual Active Learning (Manual average) has a better performance than each of the other methods tested, which becomes more apparent as more annotations are added to the model.

Example C

Comparison of Active Learning Methods where Annotator Annotates Several Elements at each Iteration As noted above, when computational cost is high, the active learning system may propose that the user labels several elements at each iteration. This technique improves the interactivity of the system, but generally involves a loss of model quality for the same number of labeled items. In the case of the exemplary visual representation, a user can target several different model ambiguities in one iteration. Table 1 compares loss in accuracy for tests using the 3 UCI datasets. Five annotations were performed between each learning/inference step. At each step, an estimate of the loss is obtained. The loss is the difference between the accuracy obtained in the previous tests (Example A, using one annotation per step) and the accuracy of the current tests (five annotations per step). This table suggests that the exemplary VAL method is less affected by the reduction in the number of learning/inference steps than the UBS methods.

TABLE 1

| Active Learning Method | Number of Annotations | | | | | | Total Loss |
|---|---|---|---|---|---|---|---|
| | Initial | 5 | 10 | 15 | 20 | 25 | |
| UBS ME | 0.00% | −3.24% | −2.89% | −3.66% | −3.44% | 0.70% | −12.54% |
| UBS diff | 0.00% | −1.91% | −5.27% | −1.89% | −0.90% | −1.46% | −11.42% |
| UBS prod | 0.00% | −4.04% | −4.00% | −3.91% | −2.17% | −2.63% | −16.75% |
| Random | 0.00% | 2.58% | 0.82% | −2.73% | 2.41% | 0.67% | 3.75% |
| Manual (VAL) | 0.00% | −0.32% | −1.17% | −4.75% | 2.39% | 0.15% | −3.69% |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An active learning system comprising:
a model comprising a probabilistic classifier, which is progressively trained, using labels applied by an annotator to unlabeled elements in a set of elements to be labeled, to associate features of the elements with classes and to predict an appropriate class for an unlabeled element in the set of elements to be labeled, the probabilistic classifier being updated at each of a plurality of iterations to generate a current model with a current probabilistic classifier, whereby at each of the plurality of iterations, the current model assigns to unlabeled elements in the set of elements to be labeled, probabilities that the elements each should be labeled with class labels for a plurality of the classes;
a representation module which generates at each of the iterations, a visual representation of a set of the unlabeled elements in the set of elements to be labeled based on the current model, the representation showing the unlabeled elements as data points in a space and showing each of a plurality of classes as a class point in the space, each class point having an associated visual identifier, for each of the iterations, the representation module projecting data points of unlabeled elements to positions in the space which are dependent on the uncertainty of the current model regarding a classification of the respective unlabeled elements, a visual identifier of each of the data points being dependent on the visual identifier of at least two of the class points and the uncertainty of the current model regarding the classification of the element;
a graphical user interface which displays the representation to the annotator and enables the annotator to select one of the unlabeled elements shown in the representation for labeling with a class label for one of the classes;
an updating module which receives class labels applied by the annotator and updates the model; and
a processor which implements the modules.

2. The system of claim 1, wherein there are at least three class points.

3. The system of claim 2, wherein the space is a three dimensional projection.

4. The system of claim 3, wherein the three dimensional projection is rotatable on the graphical user interface.

5. The system of claim 1, wherein at each of the iterations, each data point's position, relative to at least two of the class points, is computed as a function of a probability, assigned by the current model, that the respective element should be labeled with that class, and the data point is thereafter positioned at the computed position.

6. The system of claim 5, wherein at each of the iterations, the data point's position, relative to each of the class points, is computed as a function of the probability, assigned by the current model, that the respective element should be labeled with that class.

7. The system of claim 1, wherein the visual identifiers of the class points and data points are colors.

8. The system of claim 7, wherein for at least some of the data points, the data point's color is a mixture of colors of at least two of the class points which mixture reflects probabilities assigned by the model that the respective element is labeled with the respective classes.

9. The system of claim 7, wherein the class point colors are expressed in as a plurality of color values for each of a set of color dimensions and the color values for the data points are computed from the class point color values to reflect the probability assigned by the model that the respective element is labeled with the respective class.

10. The system of claim 1, wherein the class points each have a size which is larger than a size of the data points.

11. The system of claim 10, wherein the class points and data points are circles in two dimensional space or spheres in three dimensional space.

12. The system of claim 1, wherein the representation component adds noise to space overlapping data points from each other.

13. The system of claim 1, wherein the elements are selected from the group consisting of text documents, parts of text documents, and images.

14. The system of claim 1, wherein the graphical user interface includes a position selector which enables an annotator to vary positions of the class points in the space.

15. The system of claim 1, wherein for each of a plurality of iterations, the position $(x_i, y_i, z_i)$ of each data point X, in three mutually perpendicular dimensions x, y, z, is defined as a function of the model uncertainty and the current position of the class points, according to the expression (1) or (2):

$$(x_i, y_i, z_i) = (\Sigma_c W^c P_i^c x^c, \Sigma_c W^c P_i^c y^c, \Sigma_c W^c P_i^c z^c) \quad (1)$$

$$(x_i, y_i, z_i) = (\Sigma_c W^c P_i^c x^c + \epsilon x^c \text{Rand}, \Sigma_c W_c P_i^c y^c + \epsilon y^c \text{Rand}, \Sigma_c W^c P_i^c z^c + \epsilon z^c \text{Rand},) \quad (2)$$

where:
$P_i^c$ represents the probability that an element $X_i$ is labeled with a class $Y_c$ by the model;
$W^c$ represents an optional class point weight for class c;
c represents a class, where c∈C and C represents the set of classes;
Rand is a function that returns a random value; and
$\epsilon$ represents a degree of noise added.

16. The system of claim 15, wherein a color of a data point $X_i, (R_i, G_i, B_i)$ is a derived mixture of colors, as defined by the expression:

$$(R_i, G_i, B_i) = (\Sigma_c W^c P_i^c R^c, \Sigma_c W^c P_i^c G^c, \Sigma_c W^c P_i^c B^c) \quad (3).$$

17. The system of claim 1, wherein the updating includes updating the representation whereby each data point's current position, relative to at least two of the class points, is computed as a function of a probability, assigned by the updated model, that the respective element should be labeled with that class.

18. An active learning method comprising:
with a processor, generating a visual representation of a set of elements to be labeled according to class, the representation showing each of a plurality of classes as a class point in a space and showing elements to be labeled as data points in the space, each class point having an associated visual identifier, positions of the data points in the space being dependent on the uncertainty of a model regarding a classification of the respective unlabeled elements, each data point being positioned at a position, relative to at least two of the class points, which has been computed as a function of a probability, assigned by the model, that the respective element should be labeled with that class, a visual identifier of each of the data points being dependent on the visual identifier of at least one of the class points and the uncertainty of the model regarding the classification of the element;
displaying the representation;
providing for an annotator to select one of the elements that are represented in the representation for labeling with a class label for one of the classes;
updating the model based on class labels applied by the annotator; and
generating an updated visual representation in which each data point's position, relative to at least two of the class points, is computed as a function of a probability, assigned by the updated model, that the respective element should be labeled with that class.

19. The method of claim 18, wherein the space is a three dimensional space and the method includes rotating the space for viewing from different directions.

20. The method of claim 18, further comprising providing for an annotator to vary positions of the class points in the space.

21. The method of claim 18, further comprising adding noise to space overlapping data points from each other.

22. A non-transitory computer program product which encodes instructions, which when executed by a computer, perform the method of claim 18.

23. A method comprising:
initializing a model with at least one labeled element for each of a set of classes, the model configured for assigning, to each unlabeled element, probabilities that the element should be labeled with class labels for a plurality of the classes;
for a set of unlabeled elements to be labeled, generating a visual representation in which each of the classes is represented as a respective class point arranged in the at least two-dimensional space and the unlabeled elements are represented as data points in the space, each class point having a unique color, a position of each of the data points in the space being computed dependent on the assigned probabilities and the data point thereafter being positioned at the computed position, a color of each of the data points being dependent on the colors of the class points and the assigned probabilities; and
with a processor, for each of a plurality of iterations: the receiving an annotator's class label for at least one of the unlabeled elements;
updating the model based on the class labels applied by the annotator; and
generating an updated visual representation in which each unlabeled data point's current position, relative to at least two of the class points, is computed as a function of a current probability, assigned by the updated model, that the respective element should be labeled with that class and the data point is thereafter positioned at the computed position.

* * * * *